US007440838B2

(12) United States Patent
Livshiz et al.

(10) Patent No.: US 7,440,838 B2
(45) Date of Patent: Oct. 21, 2008

(54) TORQUE BASED AIR PER CYLINDER AND VOLUMETRIC EFFICIENCY DETERMINATION

(75) Inventors: Michael Livshiz, Ann Arbor, MI (US); Jeffrey M. Kaiser, Highland, MI (US); Layne K. Wiggins, Plymouth, MI (US); John A. Jacobs, Fenton, MI (US); Richard B. Jess, Haslett, MI (US); James L. Worthing, Munith, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 7 days.

(21) Appl. No.: 11/737,190

(22) Filed: Apr. 19, 2007

(65) Prior Publication Data

US 2008/0121211 A1 May 29, 2008

Related U.S. Application Data

(60) Provisional application No. 60/861,494, filed on Nov. 28, 2006.

(51) Int. Cl.
*F02D 9/04* (2006.01)
*G06F 19/00* (2006.01)

(52) U.S. Cl. ....................................... 701/103; 123/349

(58) Field of Classification Search ......... 123/345-352; 701/101, 102, 103, 104, 105, 110, 115
See application file for complete search history.

(56) References Cited

U.S. PATENT DOCUMENTS

| | | | | |
|---|---|---|---|---|
| 4,130,095 | A * | 12/1978 | Bowler et al. | 123/675 |
| 5,497,329 | A * | 3/1996 | Tang | 701/104 |
| 6,581,572 | B1 * | 6/2003 | Hurley et al. | 123/478 |
| 6,701,890 | B1 * | 3/2004 | Suhre et al. | 123/350 |
| 6,810,854 | B2 * | 11/2004 | Stroh | 123/399 |
| 7,004,144 | B2 * | 2/2006 | Stroh et al. | 123/399 |
| 7,139,656 | B1 * | 11/2006 | Mladenovic | 701/102 |
| 7,275,426 | B2 * | 10/2007 | Lahti et al. | 73/114.32 |
| 7,278,396 | B2 * | 10/2007 | Leone et al. | 123/431 |
| 7,302,335 | B1 * | 11/2007 | Xiao et al. | 701/103 |
| 2005/0056250 | A1 * | 3/2005 | Stroh | 123/350 |

OTHER PUBLICATIONS

U.S. Appl. No. 60/861,492, filed Nov. 28, 2006, Michael Livshiz et al.
U.S. Appl. No. 60/861,493, filed Nov. 28, 2006, Michael Livshiz et al.

* cited by examiner

*Primary Examiner*—Willis R. Wolfe, Jr.
*Assistant Examiner*—Johnny H. Hoang

(57) ABSTRACT

A method of regulating operation of an internal combustion engine includes monitoring a manifold absolute pressure (MAP) of the engine, determining an engine torque based on the MAP, estimating an air per cylinder (APC) based on the torque, determining a volumetric efficiency of the engine based on the APC and regulating operation of the engine based on the volumetric efficiency.

20 Claims, 3 Drawing Sheets

TORQUE BASED AIR PER CYLINDER AND VOLUMETRIC EFFICIENCY DETERMINATION

CROSS-REFERENCE TO RELATED APPLICATIONS

This application claims the benefit of U.S. Provisional Application No. 60/861,494, filed on Nov. 28, 2006. The disclosure of the above application is incorporated herein by reference.

FIELD

The present invention relates to engines, and more particularly to torque-based control of an engine.

BACKGROUND

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. As can be appreciated, increasing the air and fuel to the cylinders increases the torque output of the engine.

Engine control systems have been developed to accurately control engine speed output to achieve a desired engine speed. Traditional engine control systems, however, do not control the engine speed as accurately as desired. Further, traditional engine control systems do not provide as rapid of a response to control signals as is desired or coordinate engine torque control among various devices that affect engine torque output.

SUMMARY

Accordingly, the present disclosure provides a method of regulating operation of an internal combustion engine. The method includes monitoring a manifold absolute pressure (MAP) of the engine, determining an engine torque based on the MAP, estimating an air per cylinder (APC) based on the torque, determining a volumetric efficiency of the engine based on the APC and regulating operation of the engine based on the volumetric efficiency.

In another feature, operation of the engine is further regulated based on the APC.

In other features, the method further includes determining a correction factor based on an actual APC and correcting the APC based on the correction factor. Furthermore, the method further includes determining whether the engine is operating in steady-state. The step of correcting the APC is executed when the engine is operating in steady-state.

In another feature, the method further includes monitoring an intake air temperature. The volumetric efficiency is further based on the MAP and the intake air temperature.

In still another feature, the step of determining an engine torque includes processing the MAP through a MAP-based torque model.

In yet another feature, the step of estimating an APC includes processing the engine torque through an inverted APC-based torque model.

Further advantages and areas of applicability of the present disclosure will become apparent from the detailed description provided hereinafter. It should be understood that the detailed description and specific examples, while indicating an embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
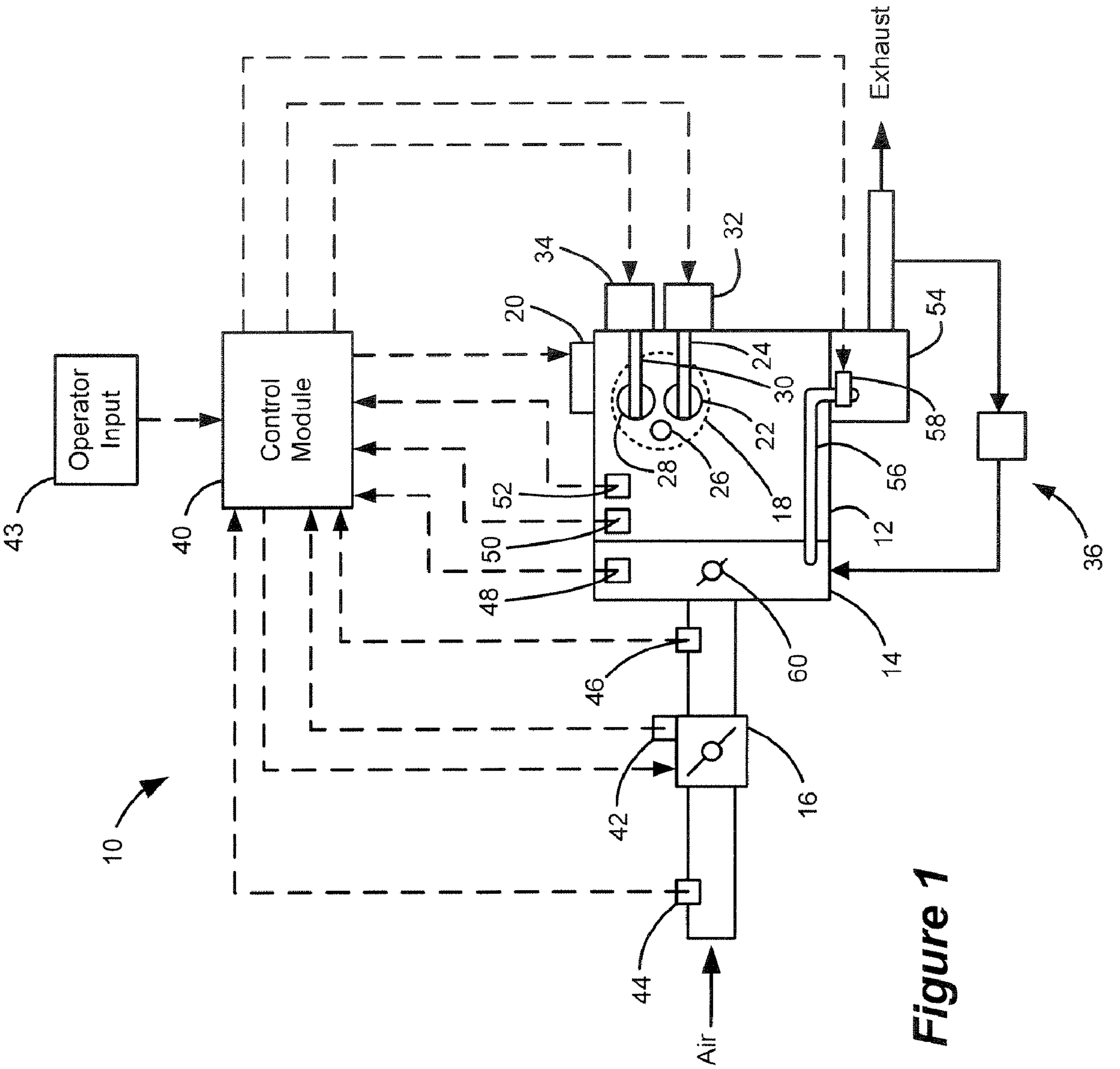
FIG. 1 is a schematic illustration of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it can be appreciated that the coordinated torque control system of the present invention can be implemented in engines having a plurality of cylinders including, but not limited to, 2, 3, 4, 5, 6, 8, 10 and 12 cylinders.

A fuel injector (not shown) injects fuel that is combined with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, which drives the piston in the cylinder 18. The piston, in turn, drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to atmosphere. Although single intake and exhaust valves 22,28 are illustrated, it can be appreciated that the engine 12 can include multiple intake and exhaust valves 22,28 per cylinder 18.

The engine system 10 can include an intake cam phaser 32 and an exhaust cam phaser 34 that respectively regulate the rotational timing of the intake and exhaust cam shafts 24,30.

More specifically, the timing or phase angle of the respective intake and exhaust cam shafts 24,30 can be retarded or advanced with respect to each other or with respect to a location of the piston within the cylinder 18 or crankshaft position. In this manner, the position of the intake and exhaust valves 22,28 can be regulated with respect to each other or with respect to a location of the piston within the cylinder 18. By regulating the position of the intake valve 22 and the exhaust valve 28, the quantity of air/fuel mixture ingested into the cylinder 18 and therefore the engine torque is regulated.

The engine system 10 can also include an exhaust gas recirculation (EGR) system 36. The EGR system 36 includes an EGR valve 38 that regulates exhaust flow back into the intake manifold 14. The EGR system is generally implemented to regulate emissions. However, the mass of exhaust air that is circulated back into the intake manifold 14 also affects engine torque output.

A control module 40 operates the engine based on the torque-based engine control of the present disclosure. More specifically, the control module 40 generates a throttle control signal and a spark advance control signal based on a desired engine speed ($RPM_{DES}$). A throttle position signal generated by a throttle position sensor (TPS) 42. An operator input 43, such as an accelerator pedal, generates an operator input signal. The control module 40 commands the throttle 16 to a steady-state position to achieve a desired throttle area ($A_{THRDES}$) and commands the spark timing to achieve a desired spark timing ($S_{DES}$). A throttle actuator (not shown) adjusts the throttle position based on the throttle control signal.

An intake air temperature (IAT) sensor 44 is responsive to a temperature of the intake air flow and generates an intake air temperature (IAT) signal. A mass airflow (MAF) sensor 46 is responsive to the mass of the intake air flow and generates a MAF signal. A manifold absolute pressure (MAP) sensor 48 is responsive to the pressure within the intake manifold 14 and generates a MAP signal. An engine coolant temperature sensor 50 is responsive to a coolant temperature and generates an engine temperature signal. An engine speed sensor 52 is responsive to a rotational speed (i.e., RPM) of the engine 12 and generates in an engine speed signal. Each of the signals generated by the sensors is received by the control module 40.

The engine system 10 can also include a turbo or supercharger 54 that is driven by the engine 12 or engine exhaust. The turbo 54 compresses air drawn in from the intake manifold 14. More particularly, air is drawn into an intermediate chamber of the turbo 54. The air in the intermediate chamber is drawn into a compressor (not shown) and is compressed therein. The compressed air flows back to the intake manifold 14 through a conduit 56 for combustion in the cylinders 18. A bypass valve 58 is disposed within the conduit 56 and regulates the flow of compressed air back into the intake manifold 14.

The torque-based VE and APC determination control of the present disclosure determines an estimated air-per-cylinder ($APC_{EST}$) and a volumetric efficiency (VE) of the engine based on the measured or actual MAP ($MAP_{ACT}$). More specifically, a MAP-based torque model is implemented to determine a MAP-based torque ($T_{MAP}$) and is described in the following relationship:

$$T_{MAP} = (a_{P1}(RPM, I, E, S) * MAP_{ACT} + a_{P0}(RPM, I, E, S) + a_{P2}(RPM, I, E, S) * B)) * \eta(IAT) \quad (1)$$

where:

S is the spark timing;

I is the intake cam phase angle;

E is the exhaust cam phase angle;

B is the barometric pressure; and $\eta$ is a thermal efficiency factor that is determined based on IAT.

The coefficients $a_P$ are predetermined values. An APC-based torque model can be used to determine an APC-based torque ($T_{APC}$) and is described in the following relationship:

$$T_{APC}=a_{A1}(RPM,I,E,S)*APC+a_{A0}(RPM,I,E,S) \quad (2)$$

The coefficients $a_A$ are predetermined values. Because $T_{MAP}$ is equal to $T_{APC}$, the APC-based torque model can be inverted to calculate $APC_{EST}$ based on $MAP_{ACT}$, in accordance with the following relationship:

$$APC_{EST} = \frac{a_{P1} * \eta * MAP_{ACT} + (a_{p0} + a_{p2} * B) * \eta - a_{A0}}{a_{A1}} \quad 3)$$

If the engine is operating at steady-state, $APC_{EST}$ is corrected based on a measured or actual APC ($APC_{ACT}$) to provide a corrected $APC_{EST}$. $APC_{EST}$ is corrected in accordance with the following relationship:

$$APC_{EST}=APC_{EST}+k_I*\int(APC_{EST}-APC_{ACT})dt \quad (4)$$

$k_I$ is a pre-determined corrector coefficient. $MAP_{ACT}$ is monitored to determine whether the engine is operating at steady-state. For example, if the difference between a current $MAP_{ACT}$ and a previously recorded $MAP_{ACT}$ is less than a threshold difference, the engine is operating at steady-state. VE is subsequently determined based on APCEST in accordance with the following relationship:

$$VE = \frac{APC_{EST}}{MAP_{ACT} * k(IAT)} \quad (5)$$

k is a coefficient that is determined based on IAT using, for example, a pre-stored look-up table. The engine is then operated based on VE and $APC_{EST}$.

Figure 2:
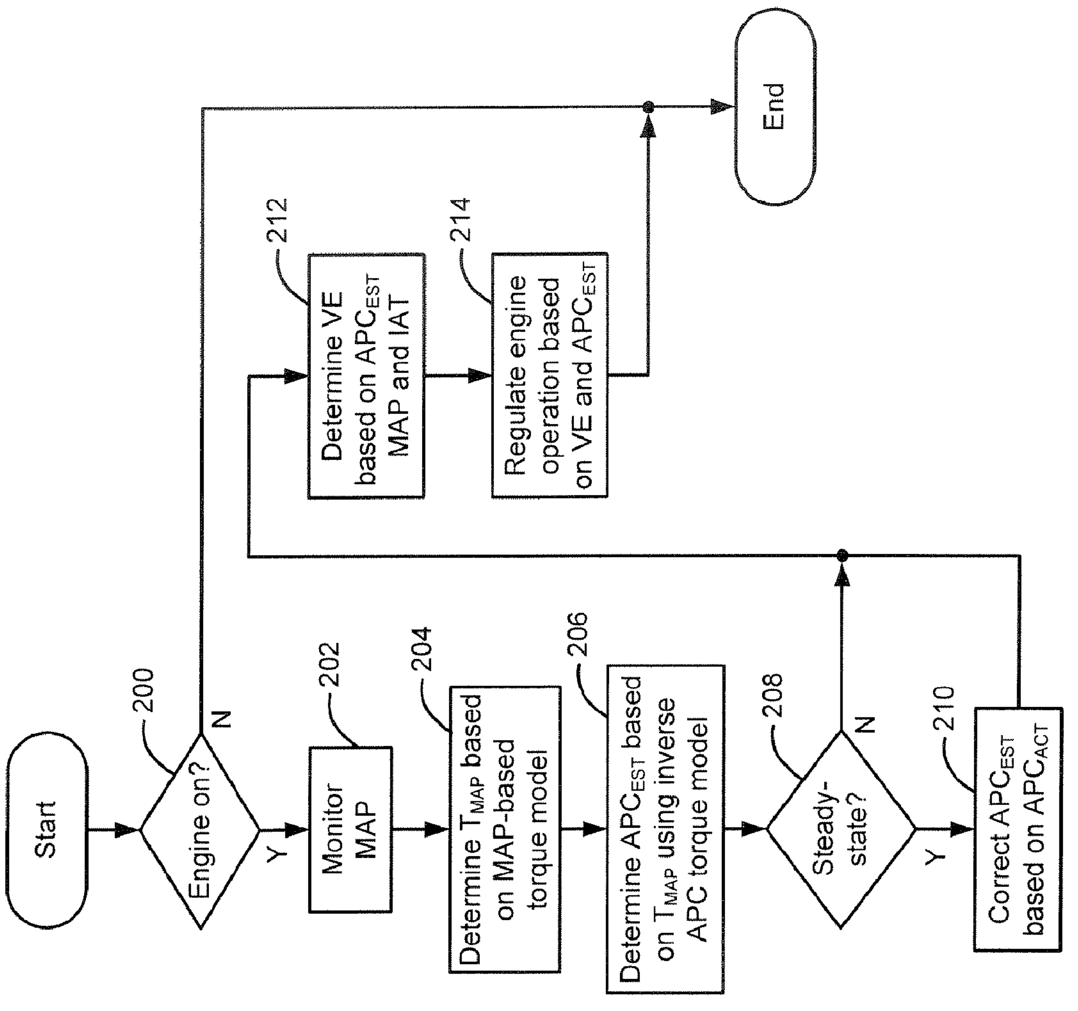
FIG. 2 is a flowchart illustrating steps executed by the torque-based volumetric efficiency (VE) and air per cylinder (APC) determination control of the present disclosure.

Referring now to FIG. 2, exemplary steps executed by the torque-based VE and APC determination control will be described in detail. In step 200, control determines whether the engine is running. If the engine is not running, control ends. If the engine is running, control monitors MAP in step 202. In step 204, control determines TMAP using the MAP-based torque model, as described in detail above. Control determines $APC_{EST}$ based on $T_{MAP}$ using the inverse APC torque model, as described in detail above.

Control determines whether the engine is operating in steady-state in step 208. If the engine is operating in steady-state, control continues in step 210. If the engine is not operating in steady-state, control continues in step 212. In step 210, control corrects $APC_{EST}$ based on $APC_{ACT}$, as described in detail above. Control determines VE based on $APC_{EST}$, MAP and IAT in step 212, as described in detail above. In step 214, control regulates engine operation based on VE and $APC_{EST}$ and control ends.

Figure 3:
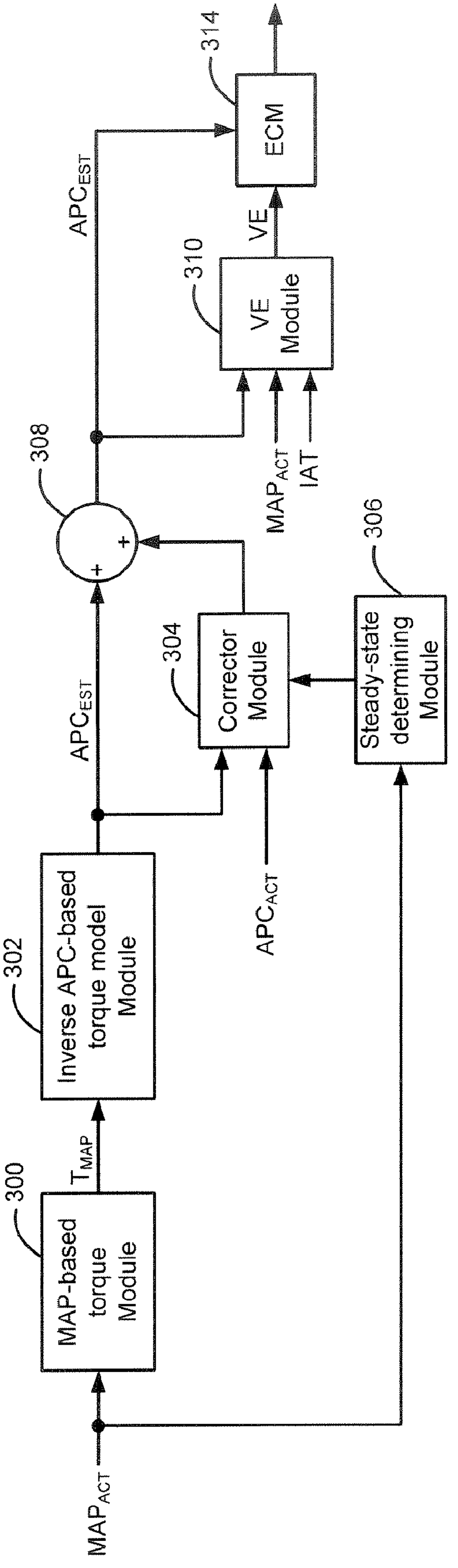
FIG. 3 is a block diagram illustrating modules that execute the torque-based VE and APC determination control of the present disclosure.

Referring now to FIG. 3, exemplary modules that execute the torque-based VE and APC determination control will be described in detail. The exemplary modules include a MAP-based torque model module 300, an inverse APC-based torque model module 304, a corrector module 304, a steady-state determining module 306, a summer module 308, a VE module 310 and an engine control module (ECM) 314. The MAP-based torque model module 300 determines $T_{MAP}$ using the MAP-based torque model described above. The inverse APC-based torque model module 302 determines $APC_{EST}$ using the inverse APC-based torque model.

The corrector module 304 determines $APC_{CORR}$ based on $APC_{EST}$, $APC_{ACT}$ and a signal from the steady-state determining module 306. More specifically, the steady-state determining module 306 determines whether the engine is operating in steady-state based on $MAP_{ACT}$. If the engine is operating in steady-state, a correction factor is output by the corrector module 304. If the engine is not operating in steady-state, the correction factor is set equal to zero. The summer module 308 sums $APC_{EST}$ and the correction factor to provide a corrected $APC_{EST}$. The VE module 310 determines VE based on $APC_{EST}$, $MAP_{ACT}$ and IAT, as described in detail above. The ECM 314 generates engine control signals based on $APC_{EST}$ and VE to regulate engine operation.

The torque-based VE and APC determination control enables both VE and APC values to be determined from a known data set. The data set is generated during the course of engine development using a tool such as DYNA-AIR. Because these values can be determined from known values, the amount of dynamometer time is reduced, because the VE and APC values do not need to be determined while the engine is running on a dynamometer during engine development. This contributes to reducing the overall time and cost of engine development. Furthermore, the torque-based VE and APC determination control provides an automated process for estimating the VE and APC values.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of regulating operation of an internal combustion engine, comprising:

monitoring a manifold absolute pressure (MAP) of said engine;

determining an engine torque based on said MAP;

estimating an air per cylinder (APC) based on said torque;

determining a volumetric efficiency of said engine based on said APC; and regulating operation of said engine based on said volumetric efficiency.

2. The method of claim 1 wherein operation of said engine is further regulated based on said APC.

3. The method of claim 1 further comprising:

determining a correction factor based on an actual APC; and correcting said APC based on said correction factor.

4. The method of claim 3 further comprising determining whether said engine is operating in steady-state, wherein said step of correcting said APC is executed when said engine is operating in steady-state.

5. The method of claim 1 further comprising monitoring an intake air temperature, wherein said volumetric efficiency is further based on said MAP and said intake air temperature.

6. The method of claim 1 wherein said step of determining an engine torque includes processing said MAP through a MAP-based torque model.

7. The method of claim 1 wherein said step of estimating an APC includes processing said engine torque through an inverted APC-based torque model.

8. A system for regulating operation of an internal combustion engine, comprising:

a first module that determines an engine torque based on a manifold absolute pressure (MAP) of said engine;

a second module that estimates an air per cylinder (APC) based on said torque;

a third module that determines a volumetric efficiency of said engine based on said APC; and a fourth module that regulates operation of said engine based on said volumetric efficiency.

9. The system of claim 8 further comprising a MAP sensor that monitors a said MAP of said engine.

10. The system of claim 8 wherein operation of said engine is further regulated based on said APC.

11. The system of claim 8 further comprising:

a fifth module that determines a correction factor based on an actual APC; and a sixth module that corrects said APC based on said correction factor.

12. The system of claim 11 further comprising a seventh module that determines whether said engine is operating in steady-state, wherein said sixth module corrects said APC when said engine is operating in steady-state.

13. The system of claim 8 further comprising a sensor that monitors an intake air temperature, wherein said volumetric efficiency is further based on said MAP and said intake air temperature.

14. The system of claim 8 wherein said first module determines said engine torque by processing said MAP through a MAP-based torque model.

15. The system of claim 8 wherein said second module estimates said APC by processing said engine torque through an inverted APC-based torque model.

16. A method of regulating operation of an internal combustion engine, comprising:

monitoring a manifold absolute pressure (MAP), an actual air per cylinder (APC) and an intake air temperature of said engine;

calculating an engine torque based on said MAP by processing said MAP through a MAP-based torque model;

calculating an estimated APC based on said torque by processing said engine torque through an inverted APC-based torque model;

determining a volumetric efficiency of said engine based on said estimated APC; and regulating operation of said engine based on said volumetric efficiency.

17. The method of claim 16 wherein operation of said engine is further regulated based on said estimated APC.

18. The method of claim 16 further comprising:

determining a correction factor based on said actual APC; and correcting said estimated APC based on said correction factor.

19. The method of claim 18 further comprising determining whether said engine is operating in steady-state, wherein said step of correcting said estimated APC is executed when said engine is operating in steady-state.

20. The method of claim 16 wherein said volumetric efficiency is further based on said MAP and said intake air temperature.

* * * * *